United States Patent

[11] 3,548,762

[72] Inventors Clarence A. Anderson
Dearborn, and
Mitchell D. Charneski, Southfield, Mich.
[21] Appl. No. 841,099
[22] Filed July 11, 1969
Continuation-in-part of application Ser. No. 668,385, Sept. 18, 1967, now Patent No. 3,467,035
[45] Patented Dec. 22, 1970
[73] Assignee The Detroit Edison Company
Detroit, Mich.
a corporation of New York

[54] SMOKELESS-ODORLESS ELECTRIC INCINERATOR
15 Claims, 2 Drawing Figs.
[52] U.S. Cl. .................................................... 110/18

[51] Int. Cl. ....................................................... F23g 3/04
[50] Field of Search .......................................... 110/8, 8E, 18, 18E

[56] References Cited
UNITED STATES PATENTS
2,823,626  2/1958  Raucher ...................... 110/18
3,156,199  11/1964  Buckle ........................ 110/8

*Primary Examiner*—Kenneth W. Sprague
*Attorney*—Whittemore, Hulbert & Belknap

ABSTRACT: Radiant heating structure for an electric incinerator forming a part of the combustion chamber comprising a plurality of heat radiating elements disposed in alignment in a restricted passageway for products of combustion. A heat reflecting and insulating plate or wall is provided at the side of the elements remote from the chamber and a heat radiating wall is disposed between elements and the chamber.

PATENTED DEC 22 1970

3,548,762

INVENTORS
CLARENCE A. ANDERSON
MITCHELL D. CHARNESKI
BY *Whittemore,*
*Hulbert & Belknap*
ATTORNEYS

SMOKELESS-ODORLESS ELECTRIC INCINERATOR

CROSS-REFERENCE TO RELATED APPLICATION

The present application is a Continuation-in-Part of our prior copending application Serial No. 668,385, filed Sept. 18, 1967, now U.S. Pat. No. 3,467,035.

BRIEF SUMMARY OF THE INVENTION

The invention relates to an electric incinerator having a combustion chamber in which combustible refuse is received. In order to ignite and promote combustion of the refuse, a radiant heating structure is provided forming a part of the enclosure of the combustion chamber and preferably the portion at one side of the chamber. The radiant heating structure comprises a plurality of parallel radiant heating rods such for example as coiled nickel chromium heating wire enclosed in ceramic alumina tubes and adapted to be heated by a flow of electric current therethrough. Other types of heating elements such as metal-sheathed rod may be used. The rods are disposed in parallelism but are further arranged in a transversely curved array partly overlying the combustion chamber and shaped to concentrate radiant energy in a zone spaced slightly above the grate normally provided in incinerator combustion zones.

At the side of the heating elements remote from the combustion chamber there is provided a reflecting wall preferably formed of metal and backed by a relatively thick and highly efficient heat insulating material. Intermediate the radiant heating elements and the combustion chamber there is provided a secondary radiating wall or plate preferably formed of metal and adapted to be brought to heat radiating temperature as a result of absorption of heat received directly from the elements and heat reflected from and radiated from the surface in back of the heat radiating elements. This secondary heat radiating surface is preferably a transversely curved metal wall.

The heat reflecting wall or plate at the rear of the heat radiating elements and the secondary radiating wall disposed between the heat radiating elements and the combustion chamber define therebetween a relatively narrow passage for products of combustion which is moreover, largely restricted by the spaced parallel heat radiating elements therein.

These metal plates are transversely curved to partly surround each of the heat radiating elements and preferably to a degree that prevents movement of products of combustion in a continuous substantially laminar flow therethrough. Instead, these transversely curved walls in cooperation with the heat radiating elements cause the products of combustion to move in turbulent flow through the restricted passageway and thus to insure a maximum of actual contact between products of combustion and the hot surfaces of the passageway, including surfaces of the heat radiating elements, of the rear essentially reflecting plate, and of the secondary radiating plate interposed between the radiating elements and the combustion chamber. This insures substantially complete combustion of any partially burned products of combustion moving through the passageway from the combustion chamber toward the stack.

In order to prevent escape of gases and odors prior to initiation of complete combustion, preferably means are provided which delay preliminary heating, drying and ignition of refuse until such time as the exposed heating surfaces in the passageway through which products of combustion escape are brought to a sufficient temperature to provide an efficient afterburner effect. This means comprises a thermal delay plate interposed between the secondary heat radiating plate and the interior of the combustion chamber. This thermal delay plate may be a smoothly curved metal plate whose curvature conforms generally to the curved array of heating elements, but separated from the heat radiating plate by an air space. With this arrangement energization of the radiant heating elements first produces radiation of heat therefrom to the essentially heat reflecting plate and the essentially heat radiating plate. Both of these plates become hot as a result of absorbed radiating energy. The essentially reflecting plate transmits heat both by reflection and secondary radiation to the heat radiating plate, loss of heat from this plate being substantially eliminated by the provision of efficient heat insulation means at its outer surface. Accordingly, the essentially heat radiating plate becomes sufficiently hot to commence efficient radiation with a substantial time delay after initial energization of the heating elements. Where the thermal delay plate is provided a further delay after the heat radiating plate comes to heat radiating temperature, is occasioned so that all exposed surfaces within the passage for products of combustion are at high temperature before any substantial amount of heat is radiated to the refuse in the combustion chamber. Accordingly, as this refuse is heated and initially gives off smoke, fumes and odors, these are completely burned as a result of contact with heated surfaces in the passageway as well as by direct radiation of heat from the heat radiating surfaces therein. Accordingly, combustion of the refuse is initiated without first causing the incinerator to give off smoke, gases and odors.

DETAILED DESCRIPTION

Figure 1:
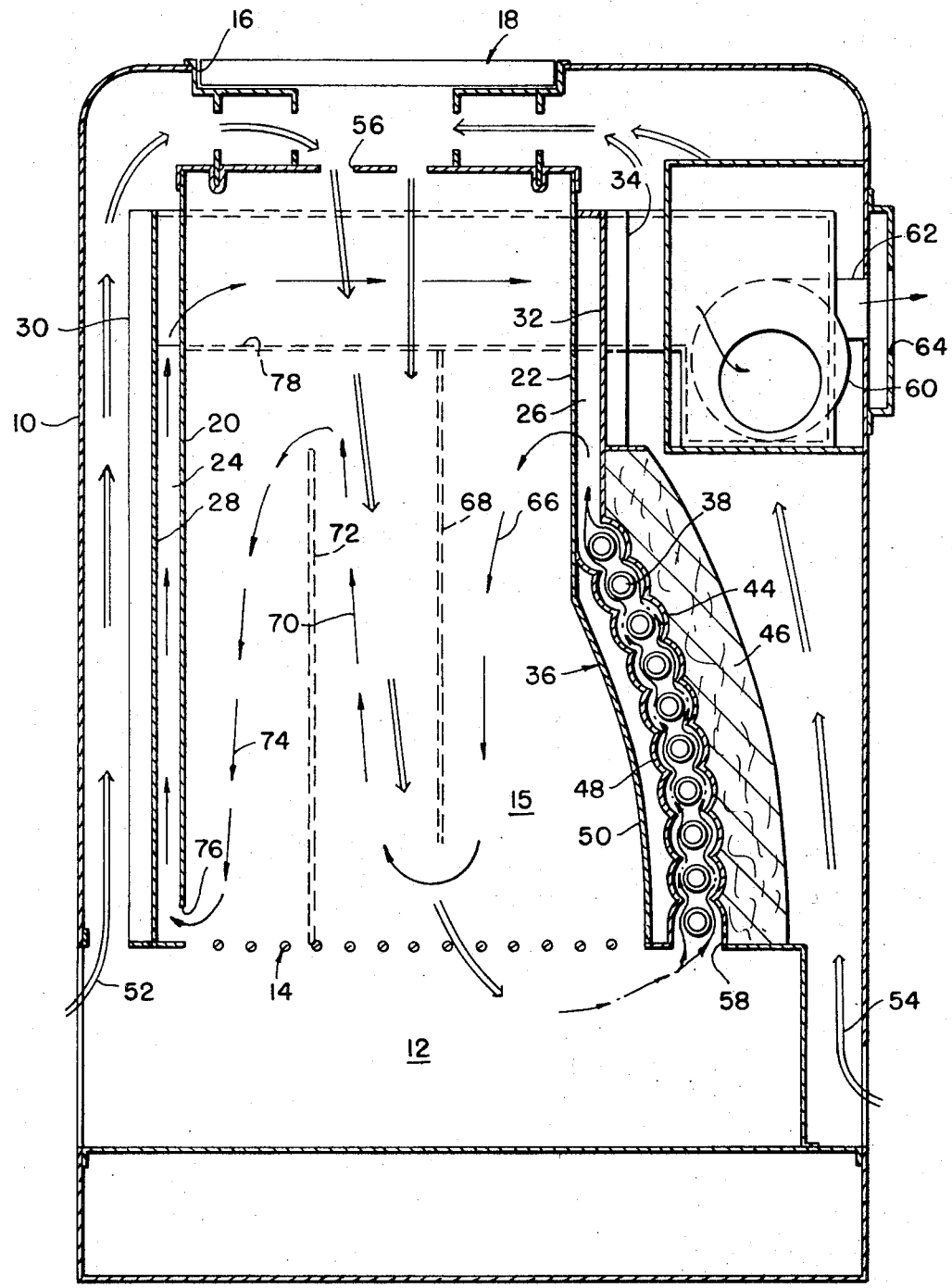
FIG. 1 is a more or less diagrammatic vertical section through an incinerator, constructed in accordance with the present invention.
Figure 2:
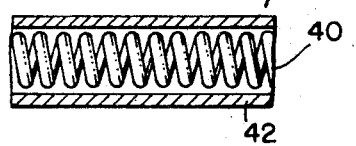
FIG. 2 is an enlarged elevational view of a portion of a heat radiating element, with parts broken away.

The electric incinerator comprises an outer shell or casing 10 which may be formed of sheet metal with or without internal insulation. The lower portion of the incinerator comprises an ash pit 12 which may receive an ash drawer (not shown) disposed directly beneath a grate indicated generally at 14 on which combustible refuse is received. The space above the grate 14 of course constitutes a combustion chamber which is indicated generally at 15.

The upper portion of the shell or casing is provided with an opening 16 which receives a closure indicated generally at 18 which may be completely removable or hinged to the casing, but which in any case is movable to provide access to the interior of the incinerator for depositing refuse therein.

It will be understood that the view in the drawing represents a generally central section so that the refuse material introduced through the opening 16 moves downwardly between a front wall 20 and a rear wall 22 onto the grate 14.

In general, the combustion chamber 15 is completed by sidewalls interconnecting the walls 20 and 22 and surrounding these walls on at least portions of all four sides are outer walls defining with the inner walls passages indicated at 24 and 26. The front outer wall is indicated at 28 and the outer surface of the wall 28 is provided with heat transfer fins 30. At the rear of the wall 22 the space 26 is formed by a rear wall 32 at least the upper portion of which is provided with heat transfer fins 34. It will be appreciated that the inner walls at the sides of the combustion chamber 15 are similarly spaced from outer walls corresponding to the walls 28 and 32 which are also finned for improving heat transfer.

In order to dry and initiate combustion in refuse placed on the grate 14, a heating structure indicated generally at 36 is provided. The heating structure comprises a multiplicity of elongated heating rods or elements 38 each of which may be in the form of an electrical resistance wire heating coil 40 formed of a material such as nickel chromium alloy. Preferably, in order to protect the heating coils 40 from the corrosive effect of the products of combustion, each is received in a tubular heat conducting and radiating tube or envelope 42 formed for example of vitrified alumina.

The heating rods 38 are disposed in parallelism with each other but the array is provided in a curved arrangement such that heat radiation is concentrated on combustible refuse received on the grate 14.

In rear of the array of heat radiating elements is an essentially heat reflecting plate 44. The plate 44 is formed of metal as for example a steel plate and it is preferably corrugated as illustrated so that each corrugation extends partly around one of the heat radiating elements 38. In rear of the plate 44 there is provided a relatively thick insulated blanket 46 which may conveniently be formed of ceramic wool or the like. With this arrangement heat radiated from the heating elements 38 to the metal plate 44 are largely reflected but a certain amount of absorption of heat takes place bringing the temperature of the plate 44 to the point at which it becomes an efficient secondary radiator. Since the insulating material 46 substantially prevents the escape of heat rearwardly from the heating structure, substantially all of the heat initially radiated rearwardly from the heating elements, eventually returns towards the interior of the combustion chamber 15.

Intermediate the heating elements 38 and the interior of the combustion chamber is a second essentially heat radiating plate 48. This plate is also given a curved pattern to partially surround each of the heat radiating elements 38. Since this plate is a metal plate, it initially serves as a reflector, but since all escape of heat to the right as seen in FIG. 1 is prevented, eventually the plate 48 reaches a radiating temperature sufficient to radiate at least the major portion of the radiant energy emitted by the heat radiating elements 38.

The heat radiated by the plate 48 is, due to the transversely curved configuration of the plate, concentrated generally on refuse deposited on the grate 14. If desired, heat may be permitted to radiate freely from the plate 48 to the refuse.

However, an important feature of the present invention is the provision of a thermal delay plate 50 which is interposed between the radiating plate 48 and the interior of the combustion chamber 15. The plate 50, as illustrated in the FIG., is preferably smoothly curved and the curvature is selected such as to concentrate normal radiation on or within refuse deposited on the grate. The thermal delay plate 50 is spaced from the radiating plate 48 by an air space so that a substantial time delay occurs between energization of the heat radiating elements 38 and the arrival of the thermal delay plate 50 at efficient heat radiating temperature.

The space between the plates 44 and 48 constitutes a wide passage for the escape for the products of combustion. This passage in cross section is relatively narrow and the curved or corrugated configuration of the plates 44 and 48, where each corrugation thereof partially surrounds one of the heat radiating elements 38, prevents direct passage of products of combustion through the passageway in anything approaching laminar flow. Instead, the products of combustion are required to change direction as they pass each heat radiating element and the result is a flow of high turbulence, increasing heat transfer from hot surfaces within the passage to the products of combustion.

The air flow through the incinerator comprises the induction of primary air at the front of the ash pit as indicated by the arrow 52 and at the rear of the incinerator as indicated by the arrow 54. The double line arrows in FIG. 1 illustrate the flow of primary air which is upwardly through spaces between the outer shell 10 and the finned outer side walls of the four walls defining the combustion chamber, the front wall comprising spaced plates 20 and 28 and the rear wall comprising spaced plates 22 and 32. It will be understood that similar double wall constructions are provided at both sides of the incinerator.

The primary air flows downwardly through openings 56 at the top of the combustion chamber, around the refuse and through the grate 14. Thereafter, the primary air which at this time a has assumed the character of products of combustion, enters the lower end of the passage 58 defined between the plates 44 and 48.

Initially, flow of air through the incinerator is induced by a blower indicated generally at 60 and having an outlet connection 62 to an opening 64 adapted to be connected to a stack.

The products of combustion, passing upwardly through the passage 58, eventually reach the space 26 between the inner rear plate 22 and the outer rear plate 32. These hot products of combustion fill the space 26 to the top and thus effect heat transfer by means of the fins 34 to some of the primary induction air.

The flow of the products of combustion from the space 26 is laterally to either side of the incinerator where it flows downwardly as indicated by the arrows 66 around a baffle plate 68 and thence upwardly as indicated by arrows 70 and over the top of baffle plate 72, and finally downwardly as indicated by the arrows 74 through ports 76 into the space 24 between the inner front plate 20 and the outer front plate 28. As these hot products of combustion pass in controlled manner through the inner space existing at all four sides of the combustion chamber by the double wall construction described above, the induction primary air is thus heated, improving efficiency of combustion within the incinerator. At the same time this induced flow of relatively cool outside air serves to maintain the temperature of the outer surfaces of the incinerator relatively cool.

When the products of combustion reach the top of the space 24 at the front of the incinerator the flow induced initially by operation of the blower 60 and increased during normal operation by convection is rearwardly through a duct 78 to the intake of the blower 60.

An important feature of the present invention is the channeling of the products of combustion through a restricted passage in a turbulent flow across and around an array of elongated, heat radiating elements and also in contact with the hot surfaces of the reflecting and radiating plates 44 and 48. This insures substantially complete odor-free combustion of the refuse.

A second important feature of the present invention is in the inherent delay between energization of the heat radiating elements 38 and the efficient radiation of heat from the plate 48 to the refuse, which permits all interior surfaces of the passage 58 to be brought to a high temperature before the refuse is caused to give off smoke or fumes prior to initiation of combustion. If desired, the thermal delay plate 50 may be provided to effect a further delay and thus to provide further assurance that the interior surfaces in the passage 58 are brought to sufficiently high temperature before fumes and odors are given off by the refuse.

It will be appreciated that the insulating blanket 46 may effectively prevent appreciable loss of heat generated by the radiating elements 38 and that except for the relatively small proportion of such heat which may be carried away with the products of combustion passing through the passage 58, all of the generated radiant heat appears in useful form within the combustion chamber.

We claim:
1. An electric incinerator comprising a combustion chamber, radiant heating structure forming a part of the enclosure of said chamber, said heating structure comprising a multiplicity of electric radiant heating elements, an outer reflecting plate located at the side of said elements remote from the interior of said chamber, an inner heat radiating plate located between said elements and the interior of said chamber, said radiating plate being brought to heat radiating temperature by radiant energy radiated directly from said elements and radiated and reflected from said reflecting plate and disposed to radiate heat toward combustible refuse disposed in said chamber, the space between said plates which contains said heating elements being generally vertically disposed and being open at its top and bottom, the bottom opening into said space being positioned to receive products of combustion from said combustion chamber, the products of combustion flowing upwardly through said space in intimate contact with said heating elements.

2. An incinerator as defined in claim 1 which comprises heat insulating material disposed at the side of said reflecting plate remote from said elements.

3. An incinerator as defined in claim 2 comprising means closing the space between the ends of said plates to define with said plates a restricted passage for products of combustion escaping from said chamber, and means directing all of the products of combustion produced within said chamber through said passage.

4. An incinerator as defined in claim 3, said heating elements being elongated and arranged in parallelism in said passage to extend across the passage transverse to the direction of flow of products of combustion therethrough.

5. An incinerator as defined in claim 4 in which both of said plates are metal.

6. An incinerator as defined in claim 4, said heating elements and plates being disposed in a curve to concentrate radiant energy in a zone occupied by refuse in said chamber.

7. An incinerator as defined in claim 4, said plates conforming closely to said elements to define a passage in which the products of combustion are channeled in a turbulent flow in close proximity to said heating elements in series.

8. An incinerator as defined in claim 4 in which said plates are corrugated to partly surround said elements and to require all products of combustion to change direction as they traverse successive elements.

9. An incinerator as defined in claim 1 comprising a second heat radiating thermal delay plate disposed inwardly of said chamber from said elements and spaced inwardly from said inner heat radiating plate.

10. An incinerator as defined in claim 1 in which said elements each comprises a resistance heating coil formed of a nickel chromium alloy and a tube of vitrified alumina surrounding the coil to protect the coil from corrosion by exhaust gases.

11. An incinerator as defined in claim 1, said combustion chamber comprising a double wall construction, means requiring products of combustion to flow serially through the open spaces between the double walls at the rear, sides and front of said chamber.

12. An incinerator as defined in claim 11 comprising a shell surrounding said double wall chamber, and means channeling primary air through the space between said chamber and shell to preheat the primary air and cool said shell.

13. An incinerator as defined in claim 12 comprising forced draft means for inducing a flow of air into said incinerator and flow of products of combustion out of said incinerator.

14. An incinerator as defined in claim 3, comprising means for delaying effective heat radiation from said heat radiating plate to provide time for all surfaces exposed within said passage to reach a temperature sufficient to insure combustion of vapors and odiferous gases during movement through said passage prior to substantial combustion within said chamber.

15. An incinerator as defined in claim 1 in which products of combustion flow downwardly from said combustion chamber, and the bottom opening into the space between said plates communicates with the space below said combustion chamber.